US006812968B1

(12) United States Patent
Kermani

(10) Patent No.: US 6,812,968 B1
(45) Date of Patent: Nov. 2, 2004

(54) CAMERA WITH CONFIGURABLE FOCUS AREA

(75) Inventor: Bahram Ghaffarzadeh Kermani, Whitehall, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/399,432

(22) Filed: Sep. 20, 1999

Related U.S. Application Data

(60) Provisional application No. 60/114,728, filed on Dec. 31, 1998.

(51) Int. Cl.[7] .................... H04N 5/232; G03B 13/00; G03B 3/00
(52) U.S. Cl. .................... 348/345; 348/348; 348/375; 396/124
(58) Field of Search .................... 348/345, 346, 348/347, 348, 349, 350, 351, 352, 353, 354, 355, 356, 357, 373, 375; 376/121, 122, 123, 124

(56) References Cited

U.S. PATENT DOCUMENTS

| | | | |
|---|---|---|---|
| 3,599,552 A | | 8/1971 | Harvey .................. 95/44 C |
| 3,691,922 A | | 9/1972 | Konig et al. ............. 95/44 R |
| 4,240,726 A | | 12/1980 | Wick .................... 354/25 |
| 4,335,942 A | | 6/1982 | Tsunekawa et al. ........ 354/25 |
| 4,638,364 A | | 1/1987 | Hiramatsu ............... 358/227 |
| 5,038,164 A | | 8/1991 | Harada .................. 354/400 |
| 5,061,954 A | | 10/1991 | Toyama et al. ........... 354/402 |
| 5,128,705 A | | 7/1992 | Someya et al. ........... 354/400 |
| 5,187,585 A | | 2/1993 | Kaneda et al. ........... 358/227 |
| 5,196,929 A | * | 3/1993 | Miyasaka ................ 348/169 |
| 5,307,112 A | | 4/1994 | Aoyama ................. 354/406 |
| 5,349,415 A | | 9/1994 | Nishida ................. 354/432 |
| 5,416,518 A | | 5/1995 | Lee et al. ............... 348/349 |
| 5,473,403 A | | 12/1995 | Suda et al. .............. 354/409 |
| 5,568,223 A | | 10/1996 | Takayama et al. ......... 396/123 |
| 5,629,735 A | * | 5/1997 | Kaneda et al. ............ 348/350 |
| 5,649,240 A | * | 7/1997 | Saegusa ................. 396/124 |
| 5,749,000 A | * | 5/1998 | Narisawa ................ 396/121 |
| 5,808,678 A | * | 9/1998 | Sakaegi ................. 348/333.03 |
| 6,088,060 A | * | 7/2000 | Suda et al. .............. 348/350 |
| 6,670,991 B1 | * | 12/2003 | Takagi et al. ............ 348/349 |
| 6,670,992 B2 | * | 12/2003 | Irie .................... 348/350 |

FOREIGN PATENT DOCUMENTS

| | | | | |
|---|---|---|---|---|
| EP | 0 399 232 | | 11/1990 | .......... H04N/5/232 |
| JP | 59105773 A | * | 6/1984 | .......... H04N/5/26 |
| JP | 61018271 A | * | 1/1986 | .......... H04N/5/232 |
| JP | 03187580 A | * | 8/1991 | .......... H04N/5/232 |

OTHER PUBLICATIONS

Canon, EOS A2 A2E, 1992.
Canon, EOS Elan II Elan IIE, 1995.

* cited by examiner

*Primary Examiner*—Wendy R. Garber
*Assistant Examiner*—Justin Misleh

(57) ABSTRACT

An imaging device having a configurable focus area comprising: (a) an imaging system for generating a video signal of an image within a field of view, wherein the imaging system is adapted to adjust the focal point of the image according to an adjustment signal; and (b) a focusing system comprising: (i) a configuration device for facilitating configuration of a focus area within the field of view; and (ii) autofocusing circuitry coupled to the imaging system and the configuration device, the autofocusing circuitry being configured for correlating a configured focus area to a portion of the video signal, analyzing the portion for resolution, and effecting an adjustment signal to the imaging system to adjust the focal point of the image to improve the resolution of the configured focus area.

10 Claims, 5 Drawing Sheets

CAMERA WITH CONFIGURABLE FOCUS AREA

CROSS REFERENCE TO RELATED APPLICATION

This application claims the benefit of U.S. Provisional Application No. 60/114,728 filed Dec. 31, 1998.

FIELD OF INVENTION

This invention relates generally to auto-focus control for optics. More specifically, the present invention relates to an auto-focus control device having a configurable focus area.

BACKGROUND OF THE INVENTION

Automatic-focusing cameras are well known in the art. In a conventional camera, a viewfinder displays a field of view and a portion of that field is a focus area. The camera comprises circuitry adapted to maximize the resolution of the image within the focus area. Although widely used and usually effective, conventional auto-focusing does have its shortcomings.

One particular drawback is the tendency for the focus area to be fixed within the field of view. Typically, the focus area is located toward the center of the field of view and cannot be moved. Although such a configuration is suitable in most situations where the object of the photograph is placed in the center of the field of view, occasionally the preferred composition of the photograph places the object elsewhere in the field of view. In such a case, the object tends to be blurred because the automatic focusing is performed only in the above-mentioned focus area regardless of the position of the intended object.

To solve this problem, cameras have been developed with "focus lock" to facilitate focusing on objects other than those located in the center of the field of view. More specifically, focus lock enables a photographer to focus on an off-center object by first placing the focus area over the object (that is, centering the object), allowing the lens to focus, locking the focus, and then, with the focus locked, changing the composition of a picture (for example, positioning the object off to a side) before taking the photograph. Unfortunately, "photo-opportunities" can be missed with these cameras since the focus must be locked before composing the shot.

Other cameras have been developed with sophisticated logic and control for measuring the distance to a plurality of objects within the field of view, determining the nearest object of the plurality, and focusing on that object. The object to be brought into focus, however, is not always the nearest. Thus, the resulting photograph may be focused on the wrong object rendering the intended object blurry.

Recently, cameras have been developed having a multiplicity of focus areas which can be selected by the user. Although affording the user with greater flexibility in composing his or her photograph, these cameras are nevertheless limited to predetermined focus areas having fixed positions and sizes.

Therefore, the applicant has identified the need for a camera having a configurable focus area that is not constrained by preset conditions. The present invention fulfills this need among others.

SUMMARY OF INVENTION

The present invention overcomes the aforementioned problems with convention auto-focus cameras by providing for a configurable focus area. A configurable focus area enables the user to position the desired focus area anywhere within the field of view. This way, the user is not limited to predefined focus areas that may not target the object upon which the user desires to focus. Additionally, the configurable focus area of the present invention may be adapted to allow the user to adjust the size and/or shape of the area.

One aspect of the present invention is an imaging device having a focus area configuration device and supporting circuitry for configuring a focus area within the field of view. In a preferred embodiment, the device comprises: (a) an imaging system for generating a video signal of an image within a field of view, wherein the imaging system is adapted to adjust the focal point of the image according to an adjustment signal; and (b) a focusing system comprising: (i) a configuration device for positioning a focus area within the field of view; and (ii) autofocusing circuitry coupled to the imaging system and the configuration device, the autofocusing circuitry being configured for correlating a configured focus area to a portion of the video signal, analyzing the portion for resolution, and effecting an adjustment signal to adjust the focal point of the image to improve the resolution of the configured focus area. Preferably, the autofocusing circuitry comprises a digital processor.

Another aspect of the present invention is the provision of the above-mentioned focusing system for use in an imaging device.

Yet another aspect of the present invention is the provision of the above-mentioned data processor for use in a camera's focusing system.

Still another aspect of the present invention is the provision of a method of using the above-mentioned imaging device: In a preferred embodiment, the method comprises the steps of: (a) moving the imaging device relative to an object to obtain a desired field of view; (b) manipulating the above-mentioned configuration device to position the focus area over the object within the field of view; (c) using the focusing system to improve the resolution of the focus area; and (d) activating a video signal processing system to transfer the video signal to a storage medium.

BRIEF DESCRIPTION OF THE DRAWINGS

The invention may best be understood by reference to the following description taken in conjunction with the accompanying drawings, wherein like reference numerals identify like elements, and wherein.

DETAILED DESCRIPTION OF THE PREFERRED EMBODIMENT

Figure 1:
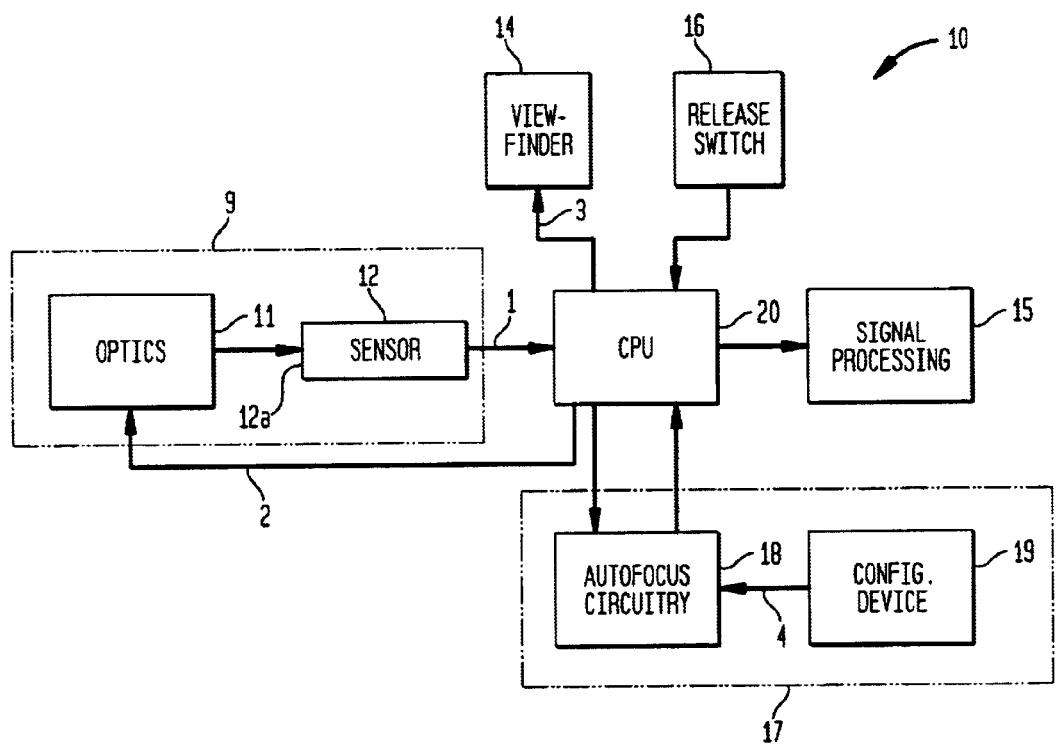
FIG. 1 shows a schematic diagram of the present invention.

FIG. 1 shows a schematic diagram of a preferred embodiment of the present invention. Depicted is a device 10 which may be a still camera, video camera, microscope or other convention image sensing apparatus requiring the adjustment of optics to bring an image of an object into focus. For illustrative purposes, the device 10 has been divided into systems and discrete components. It should be noted, however, that the circuitry described herein can be integrated or further divided into discrete components without departing from the scope of the invention.

In device 10, a video signal 1 of the object is generated in an imaging system 9. The Imaging system 9 comprises adjustable optics system 11 for forming an image and an image sensor 12, such as a charge couple device (CCD), having an image sensing plane 12a for providing a video signal of an image formed thereon by the optics system 11. The adjustable optics system 11 has the necessary circuitry and actuating means to adjust the focal point of the image on the image sensing plane according to the input of an adjustment signal 2.

A data processor 20 such as a microprocessor or a digital signal processor receives the video signal 1 from the imaging system 9. The data processor 20 is coupled to a viewfinder 14 and provides it with a display signal 3 such that viewfinder 14 displays a field of view corresponding approximately to the image formed on the image sensing plane 12a. It is also preferable for the viewfinder 14 to display a "focus area" within the field of view. As used herein, the term "focus area" refers to that area of the field of view which is subjected to autofocusing. The focus area may be displayed in the field of view, for example, as a shaded portion or as an outlined shape. Although the focus area may be any shape, rectangular, circular, oval, or square areas are preferred.

The data processor 20 is coupled to a focusing system 17. Although depicted as a discrete system for illustrative purposes, the focus system 17 may be incorporated into the data processor 20, split between the data processor 20 and other circuitry, or split among a plurality of circuits and processors depending upon the needs and preferences of the application. As shown, the focusing system 17 comprises a configuration device 19 and autofocus circuitry 18.

The configuration device 19 enables the user to configure the focus area. This configuration includes positioning the focus area anywhere within the field of view and, optionally, adjusting its size and/or shape. The configuration device may comprise one or more functional components which may be integrated or discrete. Additionally, switching may be used such that a single component has multiple functions. The functional components should be selected according to their intended purpose. For example, positioning the focus area can be performed using devices such as pointers, ball-rollers, touch pads, joysticks, and disengaged mouse-type devices. A ball-type pointer is preferred for positioning from the perspective of control and compactness. If the configuration device also configures the area and/or shape of the focus area, then additional functionality may be required. For example, a dial can be used to adjust the size or the shape of the focus area. The same dial may be used to adjust both size and shape if switching is provided between the two functions. The structure of a preferred configuration device is described in greater detail below with respect to FIGS. 2 and 3.

The configuration device 19 outputs a configuration signal 4 containing configuration information such as positional data and perhaps area data and/or shape data of the focus area. Positional data may relate to, for example, Cartesian or polar coordinates corresponding to the position of focus area's center within the field of view. Area data may relate to the number of cells or units contained within the focus area or a simple area measurement. Shape data may relate to the aspect ratio of the focus area.

The autofocus circuitry 18 receives the configuration signal 4 from the configuration device 19 and a video signal from the optical imaging system 9. The autofocus circuitry 18 has several functions. First, it "gates" the video signal which involves using the configuration information transmitted by configuration signal 4 to pass only the portion of the video signal emanating from the area of the image sensing plane corresponding to the focus area. Once the video signal corresponding to the focus area is identified and extracted, conventional autofocusing techniques may be used to effect an adjustment signal 2 to the adjustable optics system 11 thereby adjusting the focal point of the image to improve the resolution of the focus area. Suitable autofocus circuits are described, for example, in U.S. Pat. No. 5,061,954 issued to Toyama et al. and U.S. Pat. No. 5,187,585 issued to Kaneda et al. which are hereby incorporated by reference. Preferred autofocus techniques and circuitry are described below in greater detail with respect to FIG. 4.

As shown in FIG. 1, the data processor 20 also is coupled to a signal processing system 15 for performing such functions as storing the video signal on a tangible medium such as a disk or film, or converting the video signal to a standard format for television or video. Such signal processing functions are well known in the art. To activate the processing functions, a release switch 16 may be manipulated or the functions may be performed continuously. Since the device 10 is preferably a still camera, a release switch 16 is preferred to allow the user to compose the image before processing the video signal.

Figure 2:
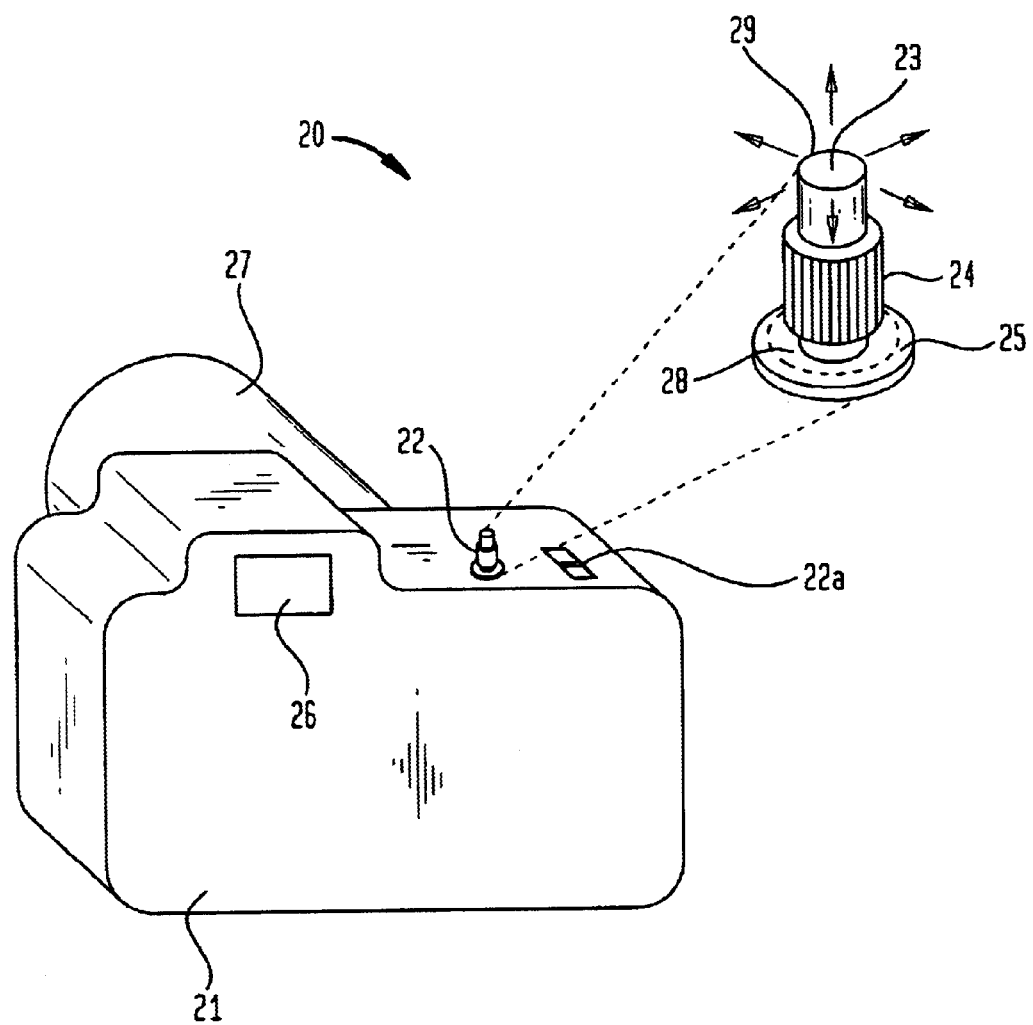
FIG. 2 a preferred imaging device embodiment of the invention.

Referring to FIG. 2, a perspective view of a camera 20 of the present invention is shown with an enlarged section corresponding to the configuration device 22. The camera 20 comprises a housing 21, a configurable lens assembly 27, a viewfinder 26, and the configuration device 22. The configuration device in this embodiment is a button-type pointer which is well known and widely used in laptop computers. As mentioned above, the button-type pointer is preferred from the stand point of controllability and compactness. The button-type pointer comprises a stub section 23 which is connected to a base 25 via a ball and socket connection 28. The ball and socket connection allows the distal end 29 of the stub section 23 to be moved about the base 25. The position of the focus area in the field of view corresponds to the position of the distal end of the stub section relative to the base 25. This relationship is described below in greater detail with respect to FIG. 3.

In the embodiment depicted in FIG. 2, the stub section 23 is axially movable to a multiplicity of depressed positions to provide additional functionality. Preferably, the stub section has two depressed positions—a first depressed position which activates the focus system and a second depressed position which activates the video processing system. In the preferred embodiment, the configuration device also comprises means of changing the size of the focus area. Accordingly, as shown in FIG. 2, the button-type pointer 22 preferably comprises a sleeve 24 coaxially and rotatably mounted around stub 23. Rotating sleeve 24 effects a change in the size of the focus area. It also may be preferable for the device to have means for adjusting the shape of the area. To this end, the same rotating sleeve 24 may be used for both functions, providing there is a selection switch 22a for switching between the two.

According to the configuration of the configuration device in FIG. 2, a user can conveniently compose his shot without excessive camera manipulation. Specifically, while viewing the field of view, a user can use his finger to move the stub section 23 such that the focus area is positioned over the desired object, and then, with the same finger, depress the stub section 23 to a first-depressed position to activate the autofocus feature and focus the object within the focus area. Finally, once the user is satisfied with the shot, he can depress the stub section 23 further to a second-depressed position with the same finger to activate video processing.

Figure 3A:
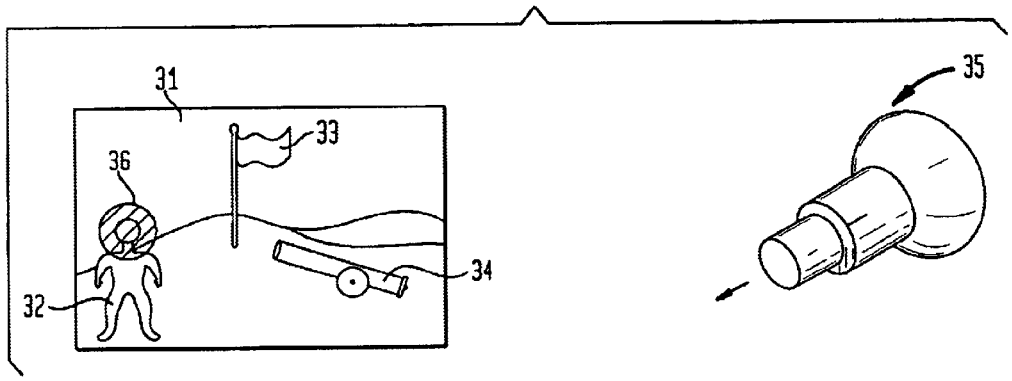
FIGS. 3a–c show the correspondence between the field of view and the configuration device of the preferred embodiment of FIG. 2.
Figure 3B:
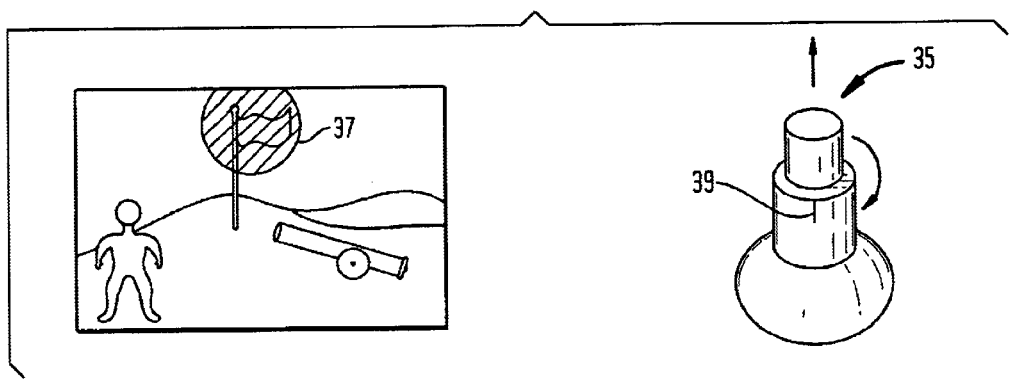
Figure 3C:
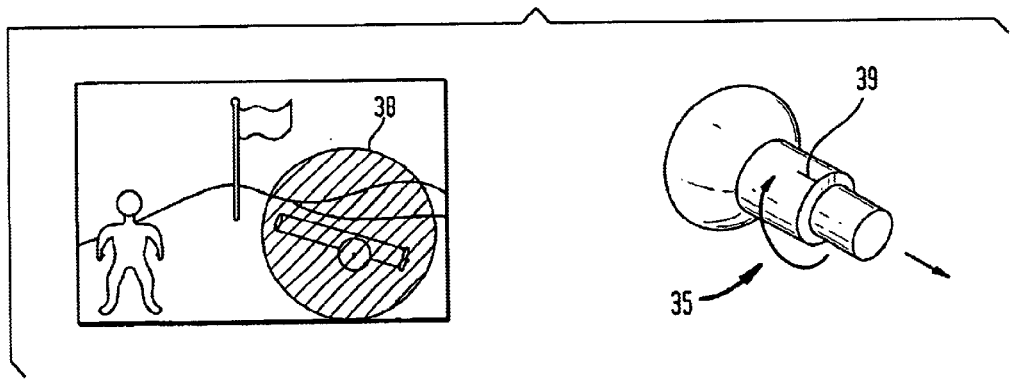

Referring to FIGS. 3a–c, the correspondence between the movement of the configuration device and the position of the focus area in the viewfinder is illustrated. The composition in the viewfinder 31 is the same in all three figures—a person 32 in the foreground to the left, a flag pole and flag 33 in the center background, and a cannon 34 in the right middle ground. The focus selection, however, varies in all three. In FIG. 3a, the head of the person is the intended object of the shot and accordingly the focus area 36 is positioned over it by manipulating configuration device 35 such that the distal end of the stub is at approximately the 8 o'clock position. In FIG. 3b, the flag atop the flag pole is the intended object of the shot and accordingly the focus area 37 is positioned over it by manipulating configuration device 35 such that the distal end of the stub is at approximately the 12 o'clock position. It is worth noting that the focus area 37 is larger than that of FIG. 3a. Increasing the focus area is accomplished by rotating the sleeve 36 of the configuration device (depicted in FIG. 3b by a change in position of hash mark 39). In FIG. 3c, the intended object is the cannon to the right, .and accordingly the focus area 38 is positioned over it by manipulating the configuration device such that the distal end of the stub is pointed at about the 4 o'clock position. In this shot, the focus area 38 is expanded to include the entire cannon by rotating the sleeve 36. Therefore, the present invention accommodates selective imaging of the same composition in the viewfinder.

Figure 4:
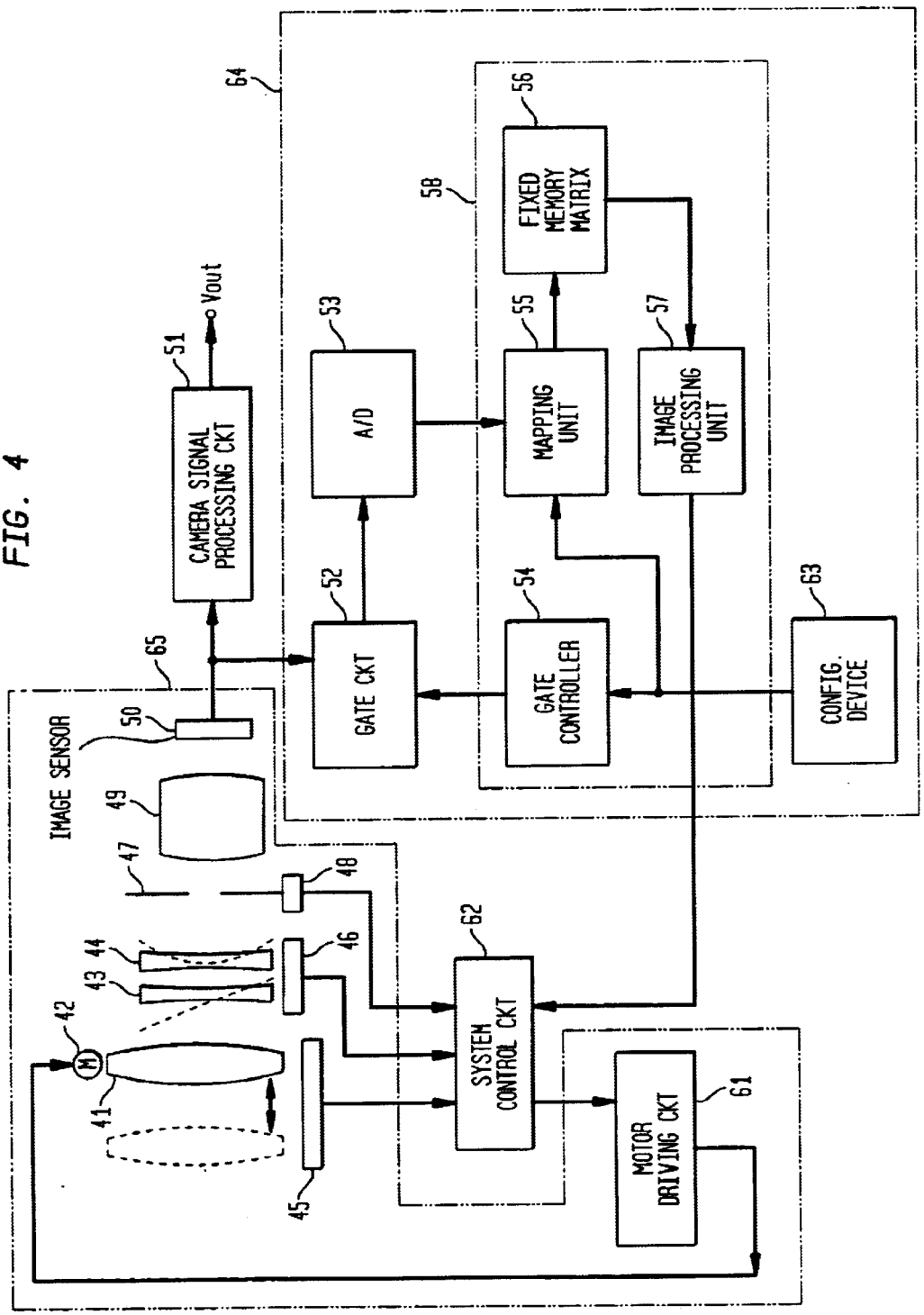
FIG. 4 shows a block diagram of the circuitry of a preferred embodiment of the present invention.

Referring to FIG. 4, a block diagram of a preferred embodiment of the device is depicted. The imaging, focusing, and processing systems described in FIG. 1 are indicated in this figure as parted lines 65, 64, and 58, respectively, although, as mentioned above, the particular grouping of circuitry and processors can vary, and integration between the various systems and components is anticipated. The adjustable optics of the imaging system 65 comprises a focusing lens group shown collectively as focusing lens 41 and arranged for use as a focus adjustment. The focusing lens 41 is movable by means of a motor 42 to focus on an infinite distance position through the nearest focusing distance position. The adjustable optics also comprises a focus encoder 45 arranged to detect the moved position of the focusing lens 41. The adjustable optics includes a zooming functionality comprising a variator lens 43 and a compensator lens 44. Zooming is performed by moving the variator and compensator lens relative to each other via a cam locus indicated by a broken line. A zoom encoder 46 is arranged to detect a focal length obtained by zooming. An iris unit 47 is arranged to adjust the quantity of light incident on an image sensor 50. An aperture encoder 48 is arranged to detect the aperture position of the iris unit 47. Light passes through a master lens 49 before reaching the image sensor 50. The image sensor 50 is preferably a CCD or the like and is arranged to produce a video signal of an object image formed on its image sensing plane.

The video signal from image sensor 50 is supplied to focusing system 64. The focusing system 64 first performs a gating action on the video signal such that only video data corresponding to the focus area passes. To this end, the configuration device 63 outputs configuration information to a gate controller 54 in the processing system 58. As mentioned above, configuration information includes the positional data and optionally size and/or shape data of the focus area. Given this information, the gate controller 54 can determine the area of the image sensing plane corresponding to the focus area. In the case of a CCD array, this area can be expressed in terms of particular rows and columns of the array. It is anticipated that a similar convention may be used with other types of imaging devices. This row/column data is transmitted via a gate control signal to gate circuitry 52. The gate circuitry 52 then passes only those video data emanating from cells located in the selected rows and columns of the CCD array in a gated video signal. To facilitate digital processing of the video data, the gated video signal is converted to a digital video signal in the A/D converter 53.

Once converted, the digital video signal is suitable for processing in the processing system 58. In the processing system 58, the digital video signal is transmitted to a mapping unit 55 which maps video data to a fixed memory matrix 56. If the focus area is fixed, the fixed memory matrix can be appropriately sized to accommodate the extracted video data. On the other hand, if the size of the focus area is configurable, then the mapping function also may involve data culling or data interpolation if the video data is more or less than the memory matrix. In other words, if the focus area involves more video data than the matrix can accommodate, then a certain amount of video data needs to be filtered out or culled. Conversely, if the amount of video data is less than the memory matrix is configured for, then data interpolation may be required to fill the voids. Because data interpolation tends to consume a significant amount of computational resources, it is preferred that the minimum size of the focus area be limited to no less than the data required to populate the memory matrix. If the focus area is configurable, then the mapping unit should be provided with area data of the focus area so that it can determine the amount of video data to cull or interpolate.

Figure 5:
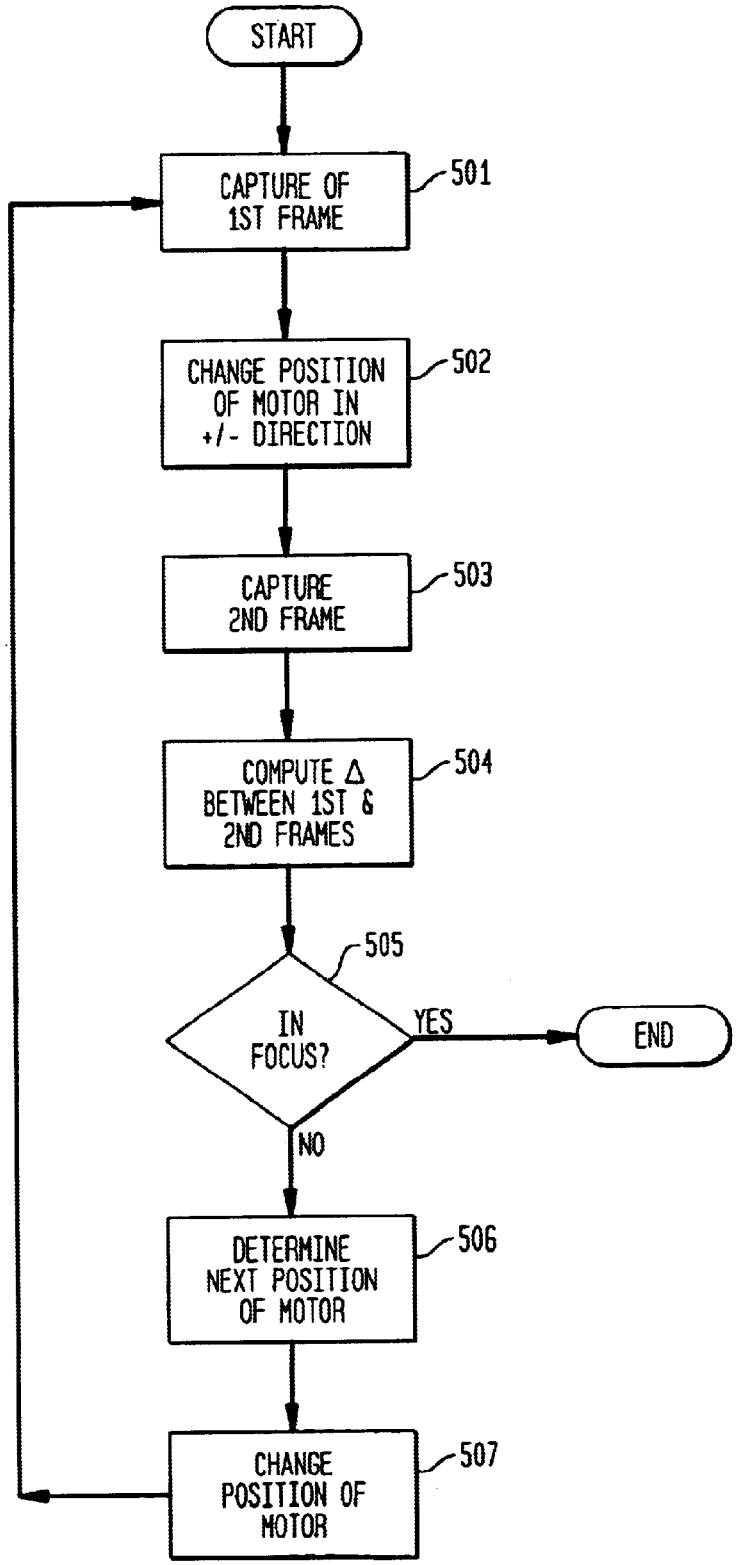
FIG. 5 shows a preferred process performed in the imaging processing unit of FIG. 4.

After the video data is mapped, an image processing unit 57 processes the data to effect improved resolution or autofocus. As mentioned above, the techniques for autofocusing are known in the art. A preferred process is depicted in the flow diagram of FIG. 5. As shown, in Block 501, the image processing unit 501 captures a first frame. Block 502 effects a change in the focal point of the optics by signaling the motor 42 (FIG. 4) to move in a particular direction via the system control circuitry 62 (FIG. 4). In Block 503, a second frame is captured. Block 504 computes the difference between the first and second frames. In Block 505 a decision is made whether the focus area has achieved a desired level of resolution. If so, the process ends. If not, however, the process proceeds to Block 506 where a decision is made as to which direction to move the motor. Block 507 effects the motor's movement in a direction according to Block 506 and the process returns to Block 501.

Although a variety of data processors are suitable for performing the above-mentioned functions, the 1675 DSP microprocessor chip available through Lucent Technologies, Inc. (Murray Hill, N.J.) is preferred. It also should be understood that although the preferred embodiment employs a digital microprocessor, the above-mentioned functions may be performed using discrete or integrated analog circuitry.

Referring back to FIG. 4, system control circuitry 62 is arranged to receive the encoder information of varied kinds from the focus encoder 45, the zoom encoder 48, and output from the image processing unit 57 according to the degree of focusing and to perform a computing operation oh these information inputs and to produce and supply an adjustment signal to the motor driving circuit 61 for controlling the focusing lens driving motor 42. The system control circuitry 62 is preferably a microprocessor.

Once the desired resolution is achieved, the video signal output from the image sensor 50 is processed by a camera signal processing circuit 51 as described above with respect to FIG. 1.

What is claimed is:

1. An imaging device comprising:
    an image sensor having an image sensing plane for providing a video signal of an image formed thereon;
    an adjustable optics system adapted to adjust the focal point of an image on said image sensing plane according to an adjustment signal;
    a viewfinder for displaying a field of view corresponding approximately to an image formed on said image sensing plane and for displaying a focus area within said field of view; and
    a focusing system comprising:
        a configuration device adapted to facilitate configuration of a focus area within said field of view, said configuration device comprising a pointer adapted for manipulation by a user to position said focus area within said field of view, and an outer sleeve rotatably and coaxially mounted about said pointer, wherein rotation of said sleeve effects a change in size of said focus area
        circuitry operatively coupled to said adjustable optics system, said image sensor, said viewfinder and said configuration device, said circuitry being configured for correlating a configured focus area to a portion of said image sensing plane, analyzing the resolution of the video signal corresponding to said portion, and effecting said adjustment signal to adjust the focal point of the image to improve resolution within said configured focus area.

2. The device of claim 1, wherein said pointer is adapted for depression to a first position to activate said focus system and to a second position to activate processing of said video signal.

3. The device of claim 1, further comprising
    a selector switch having at least a first position and a second position, said selector switch being adapted such that in said first position, rotating said sleeve effects a change in focus area size, and in said second position, rotating said sleeve effects a change in focus area shape.

4. The device of claim 1, wherein said circuitry comprises a data processor.

5. The device of claim 3, wherein said device is a still camera.

6. A focusing system for use in an imaging device having an imaging system for generating a video signal of an image within a field of view, wherein said imaging system is adapted to adjust the focal point of an image according to an adjustment signal; said focusing system comprising:
    a configuration device for facilitating configuration of a focus area within said field of view, said configuration device comprising a pointer adapted for manipulation by a user to position the focus area within said field of view, and an outer sleeve rotatably and coaxially mounted about said pointer, wherein rotation of said sleeve effects a change in size of the focus area;
    circuitry operatively coupled to said imaging system and said configuration device, said circuitry being configured for correlating a configured focus area to a portion of video signal, analyzing said portion for resolution, and effecting an adjustment signal to adjust the focal point of said image to improve resolution of said configured focus area.

7. The focusing system of claim 6, wherein said pointer is adapted for depression to a first position to activate said focus system and to a second position to activate processing of said video signal.

8. The focusing system of claim 6, further comprising a selector switch having at least a first position and a second position, said selector switch being adapted such that in said first position, rotating said sleeve effects a change in focus area size, and in said second position, rotating said sleeve effects a change in focus area shape.

9. The focusing system of claim 6, wherein said circuitry comprises a digital processor.

10. The focusing system of claim 9, wherein said digital processor comprises a gate controller for effecting an extraction of said portion of said video signal from said video signal, a fixed memory matrix, a mapping unit for mapping at least a portion of said portion to said memory matrix, and an image processing unit for analyzing the mapped portion for resolution and effecting said adjustment signal.

* * * * *